United States Patent
Liang et al.

(10) Patent No.: US 6,836,741 B2
(45) Date of Patent: Dec. 28, 2004

(54) VERTICAL CALIBRATION METHOD FOR A WIRE CUT ELECTRIC DISCHARGE MACHINE

(75) Inventors: Jui-Fang Liang, Changhwa Hsien (TW); Yea-June Day, Hsinchu Hsien (TW); Chien-Chou Chen, Taipei (TW)

(73) Assignee: Industrial Technology Reseach Institute, Hsinchu (TW)

( * ) Notice: Subject to any disclaimer, the term of this patent is extended or adjusted under 35 U.S.C. 154(b) by 52 days.

(21) Appl. No.: 10/354,386

(22) Filed: Jan. 30, 2003

(65) Prior Publication Data

US 2004/0153272 A1 Aug. 5, 2004

(51) Int. Cl.[7] ................................................. B23H 7/02
(52) U.S. Cl. ........................... 702/95; 702/97; 702/105; 219/69.17
(58) Field of Search ............................... 702/95, 33, 43, 702/85, 94, 97, 105, 115, 150, 152, 158, 166; 219/69.12, 69.16, 69.17; 700/187, 162, 176, 193, 192; 318/572, 570; 33/502, 533, 628, 630

(56) References Cited

U.S. PATENT DOCUMENTS

| | | | |
|---|---|---|---|
| 4,559,601 A | 12/1985 | Kishi et al. ................. | 364/475 |
| 4,673,788 A | 6/1987 | Buchler .................... | 219/69 W |
| 4,703,146 A | 10/1987 | Kinoshita ................ | 219/69 W |
| 4,713,517 A | 12/1987 | Kinoshita ................ | 219/69 W |
| 4,931,614 A | 6/1990 | Sumita .................... | 219/69.12 |
| 5,006,691 A | 4/1991 | Nakayama ............... | 219/69.12 |
| 5,200,906 A * | 4/1993 | Yamashita et al. .......... | 700/162 |
| 5,306,888 A * | 4/1994 | Kaneko et al. .......... | 219/69.12 |
| 6,612,043 B2 * | 9/2003 | Tsai et al. ..................... | 33/502 |
| 2003/0042228 A1 * | 3/2003 | Arakawa ................. | 219/69.12 |

* cited by examiner

Primary Examiner—Hal D Wachsman
(74) Attorney, Agent, or Firm—Schwegman, Lundberg, Woessner & Kluth, P.A.

(57) ABSTRACT

A vertical calibration method for a wire cut electric discharge machine includes selecting a known altitude for a reference point, marking down four different positions of the upper wire guide of the wire cut electric discharge machine at three different altitudes and reptitively moving the wire of the wire cut electric discharge machine being in contact with the reference point, measuring four different displacements of the upper wire guide when being in contact with the reference point, establishing an equation by using a principle of trianglation, and completing calculation of positions of the upper wire guide and the lower wire guide to finish calibration.

13 Claims, 7 Drawing Sheets

VERTICAL CALIBRATION METHOD FOR A WIRE CUT ELECTRIC DISCHARGE MACHINE

BACKGROUND OF THE INVENTION

1. Field of the Invention

The present invention relates to a vertical calibration method, and more particularly to a vertical calibration method for a wire cut electric discharge machine to easily measure the vertical position of the wire so as to be able to make the vertical wire calibration for the wire cut electric discharge machine before cutting.

2. Description of Related Art

In general, the well known technique available in the market to calibrate a wire cut electric discharge machine is disclosed in U.S. Pat. No. 4,559,601; U.S. Pat. No. 4,703,146; U.S. Pat. No. 4,713,517; U.S. Pat. No. 4,673,788; U.S. Pat. No. 4,931,614 and U.S. Pat. No. 5,006,691. Referring to U.S. Pat. No. 5,006,691; the patent discloses an automatic correction operation which is carried out by using the correction factor to correct the distance of the upper and lower wire guides from a reference table, which have been calculated as necessary for controlling the movement of the wire guides. Therefore, a series of subroutines are carried out to determine whether the wire guides are perfectly perpendicular to the reference surface.

In U.S. Pat. No. 4,931,614, developed another calibration method for a wire cut electric discharge machine in combination with a device. The device determines and sets an attitude of the wire electrode according to a total number of times of contact of one of upper and lower contact members of a perpendicularity detector in contact with the wire electrode and a ratio of a number of times of contact only of the upper contact member with the wire electrode to a number of times of contact of only the lower contact member with the wire electrode.

Figure 5:
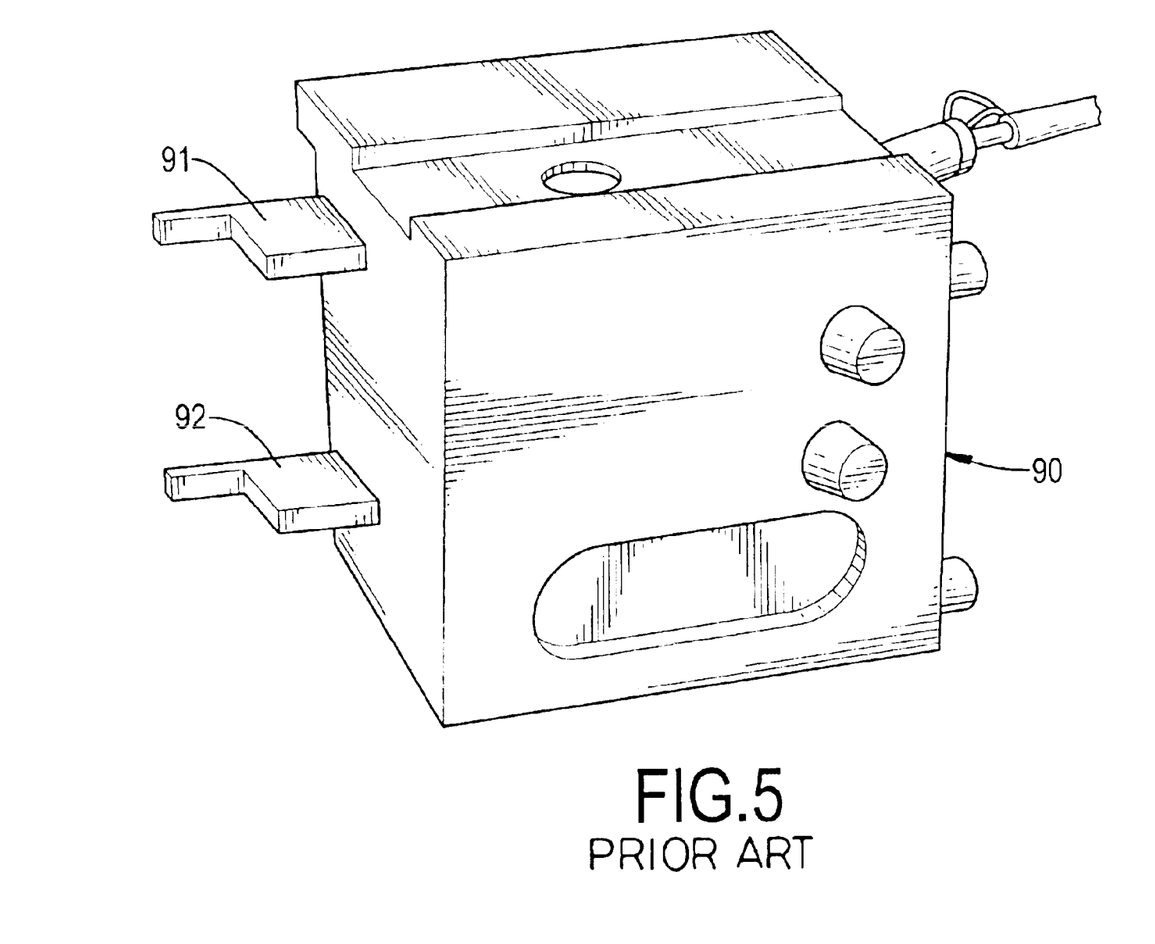
FIG. 5 is a perspective view of a conventional detection unit.
Figure 6:
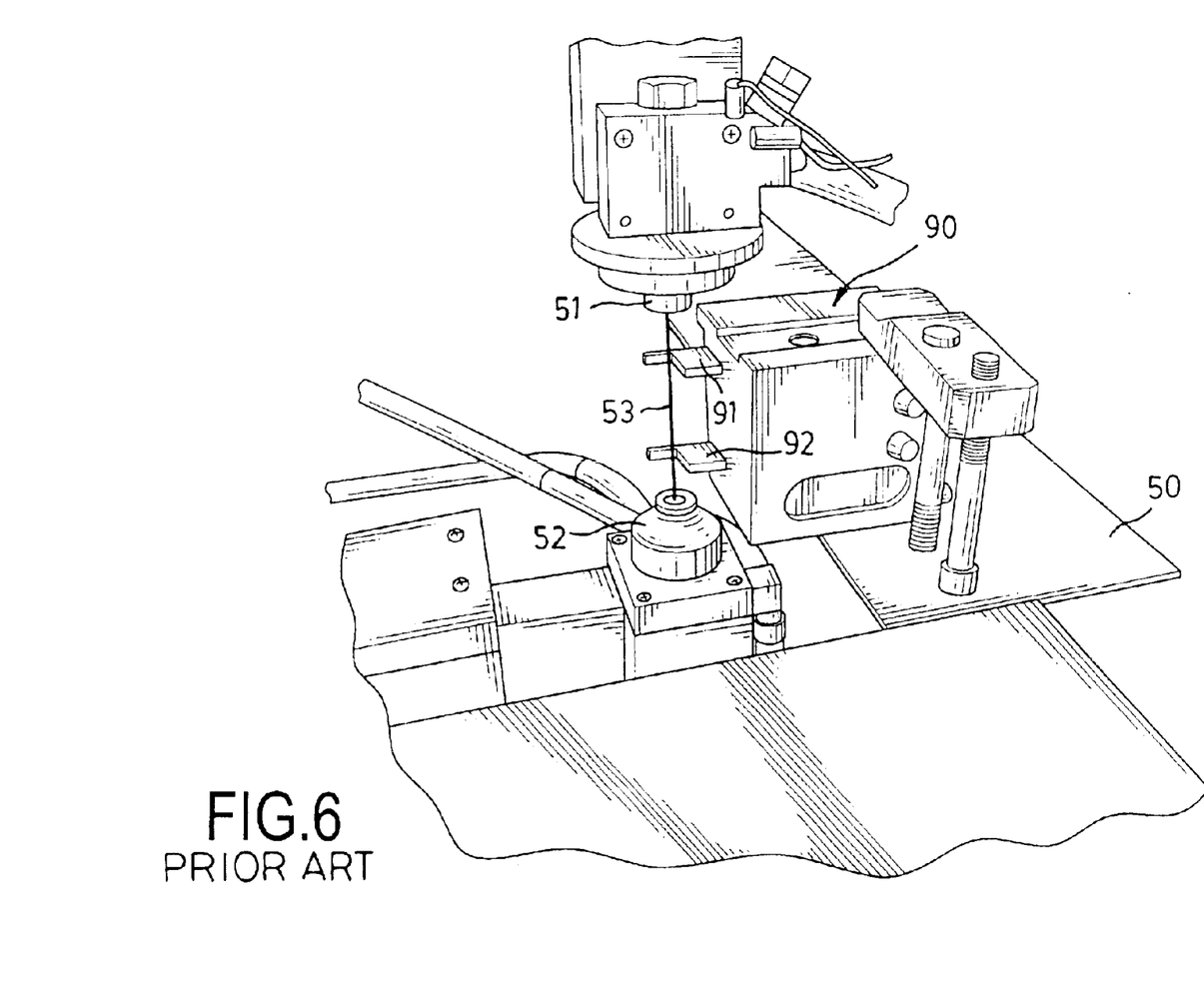
FIG. 6 is a schematic view showing the application of the detection unit in FIG. 5 to determine whether the upper wire guide and the lower wire guide are perpendicular to a reference surface.

With reference to FIGS. 5 and 6, a conventional calibration device (90) includes two detectors (91,92). A wire (53) is securely extending between the upper wire guide (51) and the lower wire guide (52). The wire (53) has to be perfectly vertical to reference surface before machining. Using the calibration device (90), the upper wire guide (51) and the lower wire guide (52) are moved to contact with both the detectors (91,92). After engagement between the wire (53) and the detectors (91,92), signals so generated are sent to control system (not shown) to determine whether the wire (53) is perpendicular to the reference surface. If the control system receives two signals simultaneously, the wire (53) is perfectly perpendicular to the reference surface.

In order to precisely determine whether the wire (53) is perpendicular to the reference surface, the precision of both the detectors (91,92) is highly requested, which causes the manufacture cost and maintenance fee skyrocketing high. Also, the calibration method is very troublesome.

To overcome the shortcomings, the present invention tends to provide an improved calibration method to mitigate and obviate the aforementioned problems.

SUMMARY OF THE INVENTION

The primary objective of the present invention is to provide an improved calibration method to quickly calibrate whether the wire in the wire cut electric discharge machine is perpendicular to the reference surface.

In order to determine whether the wire is perpendicular to the reference surface, the procedure of the present invention includes:

marking down the original position of the upper wire guide of the wire cut electric discharge machine;

moving the upper wire guide backward for a distance (m) and then marking down the second position of the upper wire guide;

moving the wire horizontally until the wire contacts with the detection unit and then marking down the third position of the upper wire guide and measuring the distance between the second position and the third position of the upper wire guide;

returning the top wire to the second position and then lifting the upper wire guide for a distance (k) and marking the fourth position of the upper wire guide;

moving the wire horizontally until the wire contacts with the detection unit and then marking down the fifth position of the upper wire guide;

returning the top wire to the last position and then lifting the upper wire guide for another distance (k) and marking the sixth position of the upper wire guide;

moving the wire horizontally until the wire being contact with the detection unit and then marking the seventh position of the upper wire guide and measuring the distance between the sixth position and the seventh position; and calculating the vertical position of the top wire and the distance between the upper wire guide and the lower wire guide using the principle of triangle.

Other objects, advantages and novel features of the invention will become more apparent from the following detailed description when taken in conjunction with the accompanying drawings.

DETAILED DESCRIPTION OF THE PREFERRED EMBODIMENT

Figure 1:
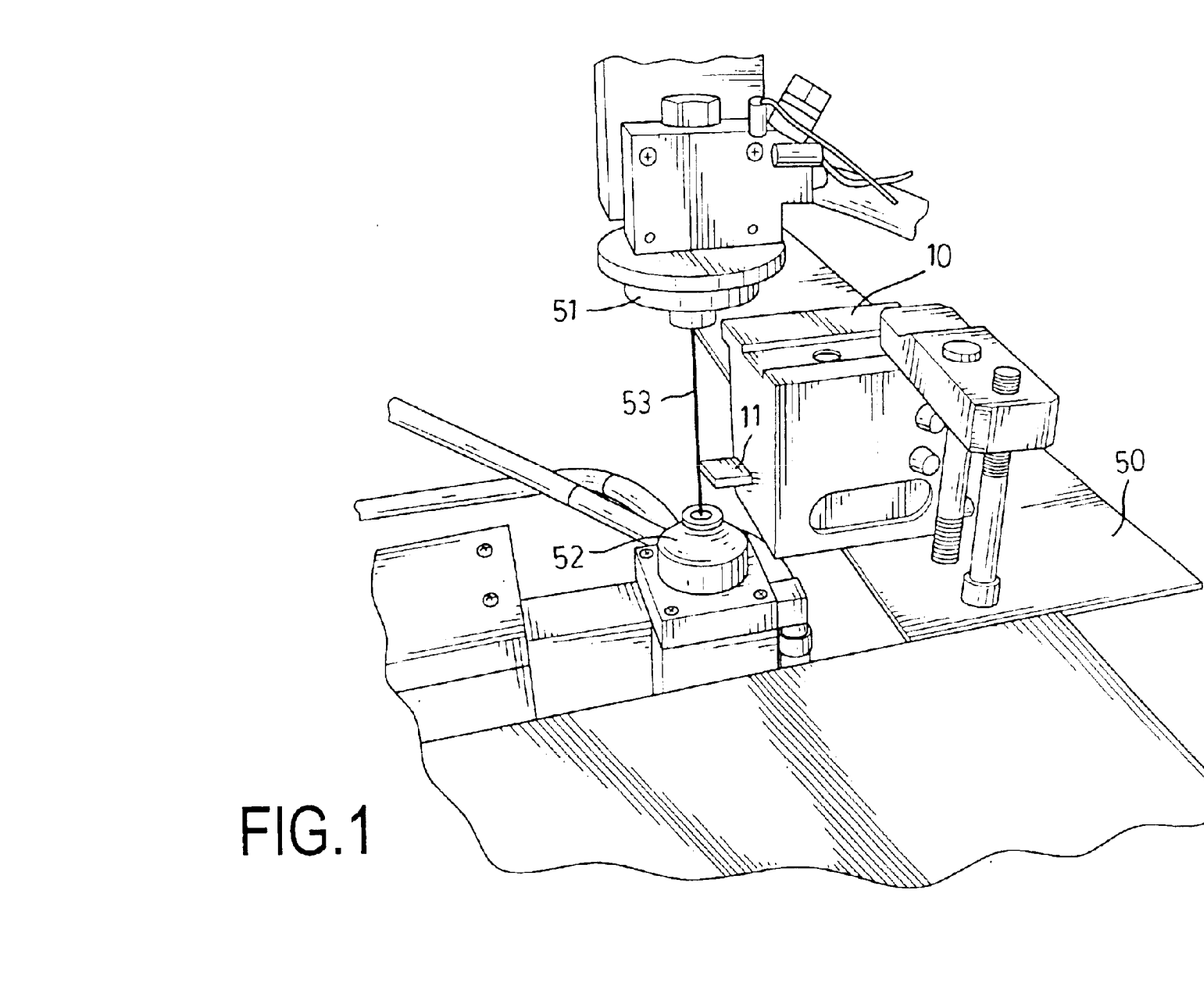
FIG. 1 is a perspective view of a part of the wire cut electric discharge machine and the detection unit.
Figure 2:
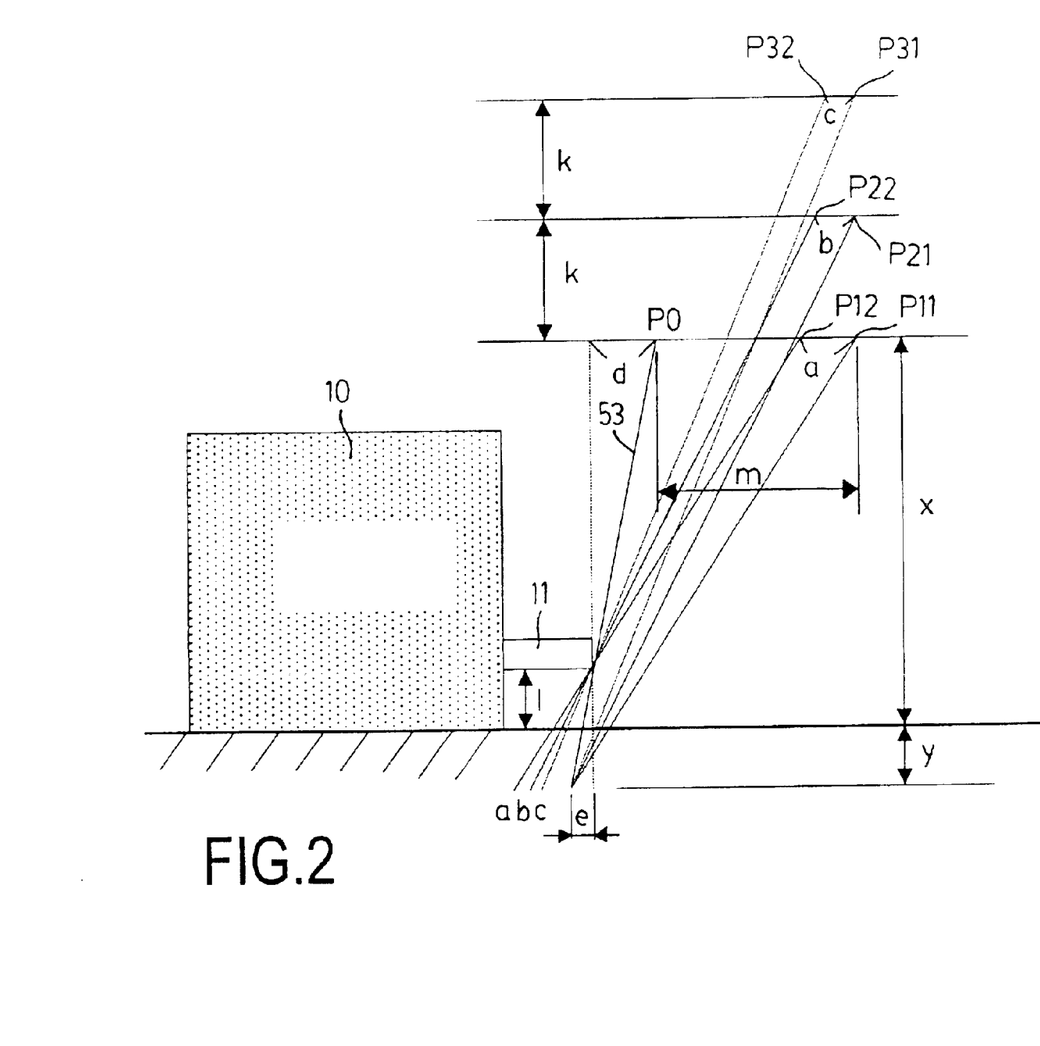
FIG. 2 is a chart showing the movements of the wire cut electric discharge machine to calibrate the wire to be perpendicular to the reference surface.
Figure 7:
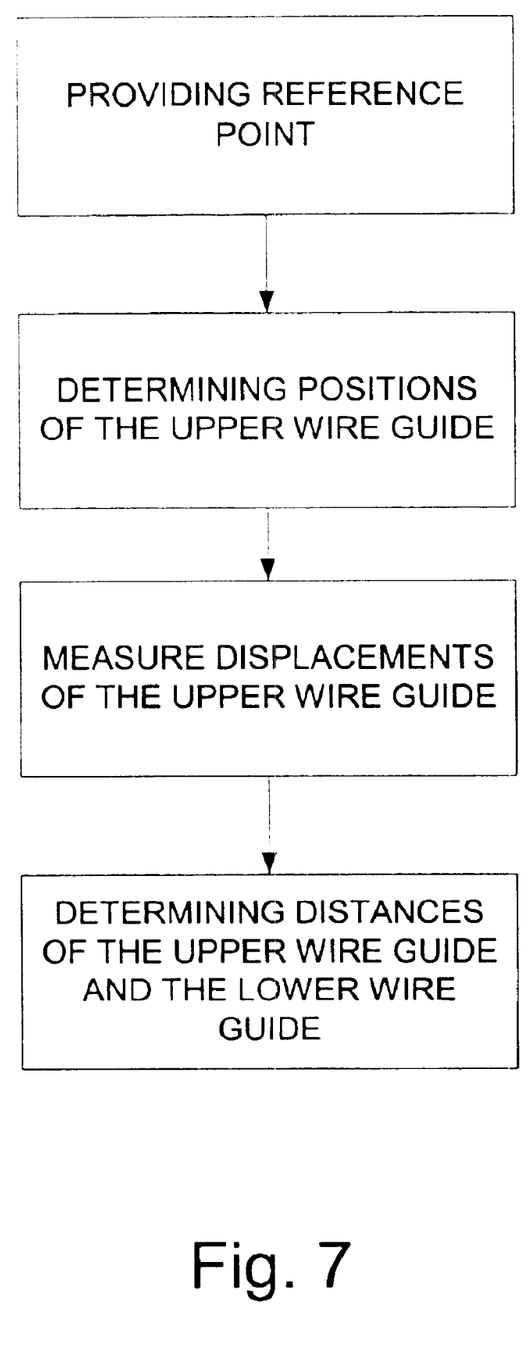
FIG. 7 is a flow chart showing the steps of the method of the present invention.

With reference to FIGS. 1, 2 and 7, the detection unit (10) has a single detector (11) connected to the detection unit (10). There are two ways to make connections between the detector (11) and the detection unit (10), one is that an insulation material is applied to separate the detector (11) from the detection unit (10) such that when the wire (53) is moved to contact with the detector (11), the signal will be sent to the control system (not shown) to determine whether the wire (53) contacts with the detector (11), and the other is that the detector (11) is electrically connected to the detection unit (10) such that when there is voltage change in the detection unit (10), the wire (53) contacting with the detector (11) is confirmed.

In order to calibrate the upper wire guide (51) and the lower wire guide (53) to be perpendicular to the reference surface, the method of the present invention comprises the steps of:

marking down the first position (P0) of the upper wire guide (51) of the wire cut electric discharge machine (50) where the wire (53) contacts with the detector (11) of the detection unit (10);

moving the upper wire guide (51) backward for a distance (m) and then marking down the second position (P11) of the upper wire guide (51);

moving the wire (53) horizontally to allow the wire (53) to contact with the detector (11) of the detection unit (10) and then marking down the third position (P12) of the upper wire guide (51) and calculating the distance (a) between the second position (P11) and the third position (P12) of the upper wire guide (51);

returning the wire (53) to the second position (P11) and then lifting the upper wire guide (51) for a distance (k) and marking the fourth position (P21) of the upper wire guide (51);

moving the wire (53) horizontally to allow the wire (53) to contact with the detector (11) of the detection unit (10) and then marking down the fifth position (P22) of the upper wire guide (51) and calculating the distance (b) between the fifth position (P22) and the fourth position (P21);

returning the wire (53) to the fourth position and then lifting the upper wire guide (51) by another distance (k) and marking the sixth position (P31) of the upper wire guide (51);

moving the wire (53) horizontally to allow the wire (53) to contact with the detector (11) of the detection unit (10) and then marking the seventh position (P32) of the upper wire guide (51) and calculating the distance (c) between the sixth position (P31) and the seventh position (P32); and calculating the original positions of the upper wire guide (51) and the lower wire guide (52) and the distances from the upper wire guide (51) to the reference surface and the lower wire guide (52) to the reference surface using the principle of triangle.

What are already known in the aforementioned relationships are:

m: the lateral displacement of the upper wire guide;

k: the upward displacement of the upper wire guide;

l: the distance between the working table and the detection point on the detector (11) of the detection unit (10);

a, b, and c: after moving m distance, the distances measured from the wire (53) at different original positions to the positions which contact with the detector (11) of the detection unit (10);

The variables to be determined include:

d: distance between the upper wire guide (51) to the vertical line e: distance between the lower wire guide (52) to the vertical line x: distance between the upper wire guide (51) to the working table (50)

y: distance between the lower wire guide (52) to the working table (50)

Therefore, using the triangle principle, we have:

$$\frac{e}{y+1} = \frac{d}{x-1}$$

$$\frac{a+e}{y+1} = \frac{m+d-a}{x-1}$$

$$\frac{b+1}{y+1} = \frac{m+d-b}{x+k-1}$$

$$\frac{c+1}{y+1} = \frac{m+d-c}{x+2k-1}$$

solving for d, e, x, y, we have $d=[a(b-2c)+bc](m-a)/a(a-2b+c)$ $e=a(b-2c)+bc/a-2b+c$ $x=[2b(k-l)+c(-2k+l)]m+a(-2bk+2ck+lm)/m(a-2b+c)$ $y=(2b-c)lm+a(2bk-2ck-lm)/m(a-2b+c)$ If the known variables, such as m, k, l, a, b, and c are replaced with specific numerals, the variables d, e, x and y are determined.

Figure 3:
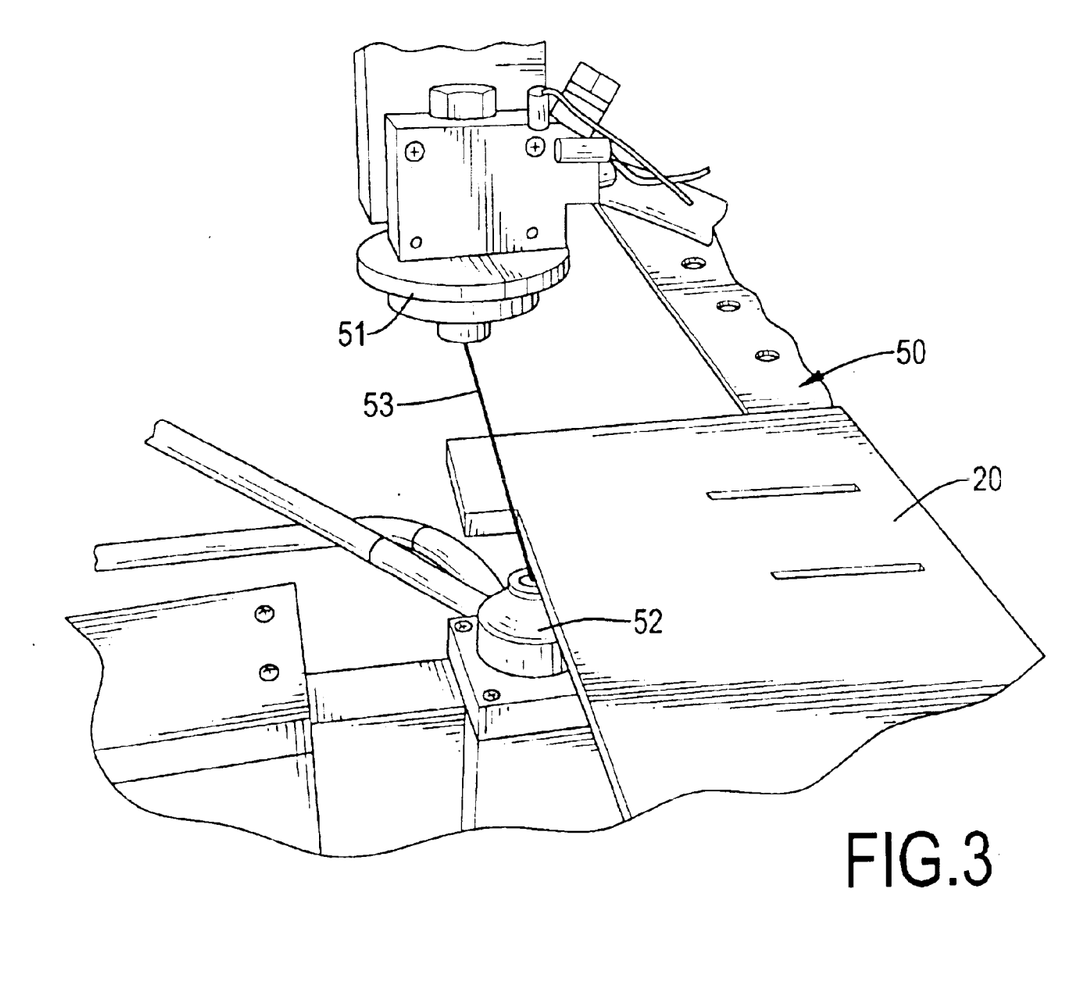
FIG. 3 is a perspective view showing that a workpiece is employed to determine whether the top wire is perpendicular to a reference surface.
Figure 4:
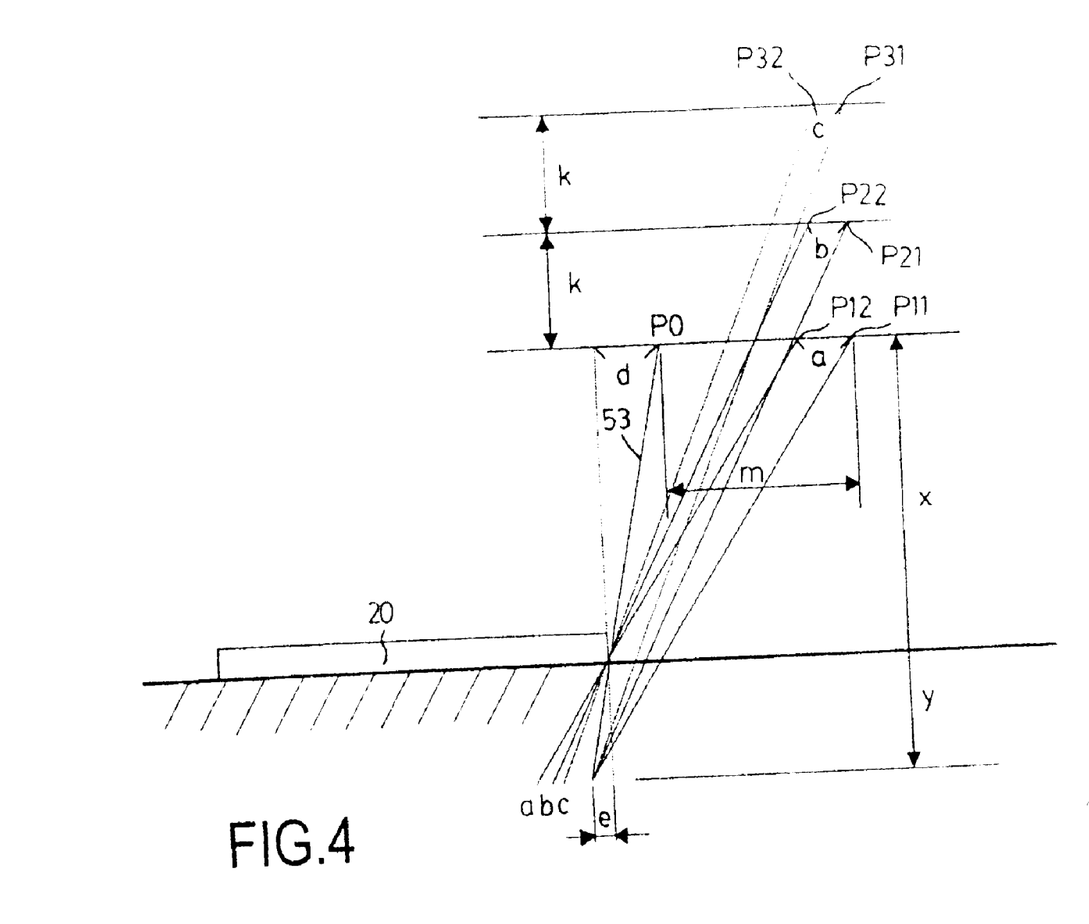
FIG. 4 is a chart showing the movements of the upper wire guide and the lower wire guide of the wire cut electric discharge machine to determine whether the upper wire guide and the lower wire guide are perpendicular to the reference surface by using the finished workpiece.

With reference to FIGS. 3 and 4, a finished workpiece (20) may also be applied to determine whether the upper wire guide (51) and the lower wire guide (53) are perfectly vertical.

It is noted that because the lower face of the workpiece (20) engages with the working table of the wire cut electric discharge machine (50), the bottom edge of the workpiece is able to be applied as the reference point to determine whether the upper wire guide and the lower wire guide are perpendicular to the reference surface without using any detection unit.

Because the distance between the working table and the detection point is zero (0), the foregoing equation is simplified as:

$d=[a(b-2c)+bc](m-a)/(a-2b+c)$ $e=a(b-2c)+bc/a-2b+c$ $x=2k(b-c)(m-a)/m(a-2b+c)$ $y=2ak(b-c)/m(a-2b+c)$

Replacing the known variables m, k, a, b, c with specific numerals, the initial positions of the upper wire guide and the lower wire guide are able to be calculated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vertical calibration method for a wire cut electric discharge machine having an upper wire guide, a lower wire guide and a wire securely connected between the upper wire guide and the lower wire guide, the method comprising:

providing the altitude of a detector on the wire cut electric discharge machine as a reference point;

determining four different positions of the upper wire guide of the wire cut electric discharge machine at three different altitudes and repetitively moving the wire of the wire cut electric discharge machine until it contacts with the reference point to form two symmetric triangles;

measuring four different displacements of the upper wire guide when the wire contacts with the reference point; and determining distances of the upper wire guide and the lower wire guide.

2. The method as claimed in claim 1, wherein determining four different positions includes:

moving the wire horizontally to contact with the reference point; and displacing the upper wire guide by a distance and then moving the wire to contact with the reference point at three different altitudes.

3. The method as claimed in claim 2, wherein the reference point is a detection unit with a known altitude.

4. The method as claimed in claim 3, wherein the reference point of the detection unit is flush with a working table of the wire cut electric discharge machine.

5. The method as claimed in claim 4, wherein the displacements of the upper wire guide have a same numerical quantity.

6. The method as claimed in claim 2, wherein the displacements of the upper wire guide have a different numerical quantity.

7. The method as claimed in claim 2, wherein a position of the reference point is higher than a position of a working table of the wire cut electric discharge machine.

8. The method as claimed in claim 2, wherein a position of the reference point is lower than a position of a working table of the wire cut electric discharge machine.

9. The method of claim 1, wherein determining distances of the upper wire guide and the lower wire guide include calculating an upper wire guide offset from vertical distance "d" based on the formula $$d=[a(b-2c)+bc](m-a)/a(a-2bc+c)$$

where "m" is a set displacement, "a" is a first distance at a first height measure between the set displacement "m" and a first position where the guide wire contacts the detector, "b" is a second distance at a second height measured between the set displacement "m" and a second position where the guide wire contacts the detector, and "c" is a third distance at a third height measured between the set displacement "m" and a third position where the guide wire contacts the detector.

10. The method of claim 9, wherein determining distances of the upper wire guide and the lower wire guide include calculating a lower wire guide offset from vertical distance "e" based on the formula $$e=a(b-2c)+bc/(a-2bc+c).$$

11. The method of claim 10, wherein determining distances of the upper wire guide and the lower wire guide include calculating the first height based on the formula $$\text{first height}=2k(b-2)(m-a)/m(a-2b+c)$$

where "k" is the difference between the first height and the second height.

12. The method of claim 11, wherein determining distances of the upper wire guide and the lower wire guide include calculating a distance "y" of the lower wire guide beneath a reference plane based on the formula $$y=2ak(b-c)/m(a-2b+c).$$

13. A method of calibrating the position of a wire in a wire cut machine, comprising:

moving an upper guide and a lower guide so that a cutting wire held between the upper guide and the lower guide contacts a detector whereat a first position of the upper guide and a second position of the lower guide are determined;

moving the upper guide a predetermined first distance from the first position to a third position;

moving the upper guide and the lower guide toward the detector while maintaining the angle of the wire until the wire contacts the detector whereat a fourth position of the upper guide is determined;

returning the upper guide and the lower guide to the third position and second position, respectively;

vertically moving the upper guide a predetermined second distance to a fifth position with the lower guide being held at the second position;

moving the upper guide and the lower guide toward the detector while maintaining the angle of the wire until the wire contacts the detector whereat a sixth position of the upper guide is determined;

returning the upper guide and the lower guide to the fifth position and second position, respectively;

vertically moving the upper guide a predetermined third distance to a seventh position with the lower guide being held at the second position;

moving the upper guide and the lower guide toward the detector while maintaining the angle of the wire until the wire contacts the detector whereat an eighth position of the upper guide is determined; and calculating, based on the first, third, fourth, fifth, sixth, seventh and eighth positions of the upper guide, at least one of a vertical offset of the upper guide, a vertical offset of the lower guide, a distance of the upper guide above a work surface, and a distance from the work surface to the lower guide.

* * * * *